United States Patent [19]

Szczepanek

[11] Patent Number: 5,832,216
[45] Date of Patent: Nov. 3, 1998

[54] NETWORK ADAPTER HAVING SINGLE PORTED MEMORY WHICH IS ACCESSIBLE BY NETWORK AND PERIPHERAL BUS ON A TIME DIVISION MULTIPLEXED (TDM) BASIS

[75] Inventor: Andre Szczepanek, Bedford, England

[73] Assignee: Texas Instruments Incorporated, Dallas, Tex.

[21] Appl. No.: 859,519

[22] Filed: May 20, 1997

Related U.S. Application Data

[63] Continuation of Ser. No. 334,306, Nov. 4, 1994, abandoned.
[51] Int. Cl.$^6$ .................................................. G06F 15/167
[52] U.S. Cl. ...................... 395/200.8; 395/308; 395/287; 395/309; 395/800.29; 711/147; 711/104; 711/157; 711/151
[58] Field of Search ..................... 370/391, 395, 370/280, 314, 905, 915, 916; 395/800.28, 800.29, 800.36, 200.8, 309, 307, 306, 287; 711/127, 130, 131, 147, 149, 157, 104

[56] References Cited

U.S. PATENT DOCUMENTS

| | | | |
|---|---|---|---|
| 4,309,754 | 1/1982 | Dinwiddie, Jr. .......................... | 395/307 |
| 4,933,846 | 6/1990 | Humphrey et al. ....................... | 395/200 |
| 5,247,626 | 9/1993 | Firoozmand ............................ | 395/250 |
| 5,365,512 | 11/1994 | Combs et al. ............................ | 370/16 |
| 5,412,782 | 5/1995 | Hausman et al. ........................ | 395/250 |
| 5,423,009 | 6/1995 | Zhu ........................................ | 395/307 |
| 5,475,683 | 12/1995 | Harrison et al. ........................ | 370/68.1 |
| 5,557,750 | 9/1996 | Moore et al. ............................ | 395/309 |
| 5,559,969 | 9/1996 | Jennnigs ................................. | 395/307 |
| 5,590,349 | 12/1996 | Robinson et al. .................. | 395/800.36 |
| 5,623,634 | 4/1997 | Liu ........................................ | 711/151 |
| 5,710,892 | 1/1998 | Goodnow et al. ....................... | 395/307 |

OTHER PUBLICATIONS

Jeffrey Robinson; "Architecture Align for Telecom Use"; Electronic Engineering Times Feb. 21, 1994, ISSN: 0192–1541. p. 68.

Gonzales, D. R.; "Interfacing–multi–processors Using devices with dual–port RAM"; May 1, 1985, Microelectronics Journal.

Opsommer J. et al; "A VLSI processor–switch for a dual IEEE–796 Bus with Shared and Dual–port memory"; IEEE 1989; 4–146 to 4–149.

Primary Examiner—Meng-Ai T. An
Attorney, Agent, or Firm—J. Dennis Moore; James C. Kesterson; Richard L. Donaldson

[57] ABSTRACT

This invention relates to an improved LAN adapter. The LAN adapter includes a time division multiplex (TDM) ported RAM. The RAM is used to provide both network data FIFOs and control data storage in a single memory element. The network and peripheral components are able to access the same memory, but at different times in the cycle, thereby minimizing the component count and optimizing the operation of the adapter.

10 Claims, 1 Drawing Sheet

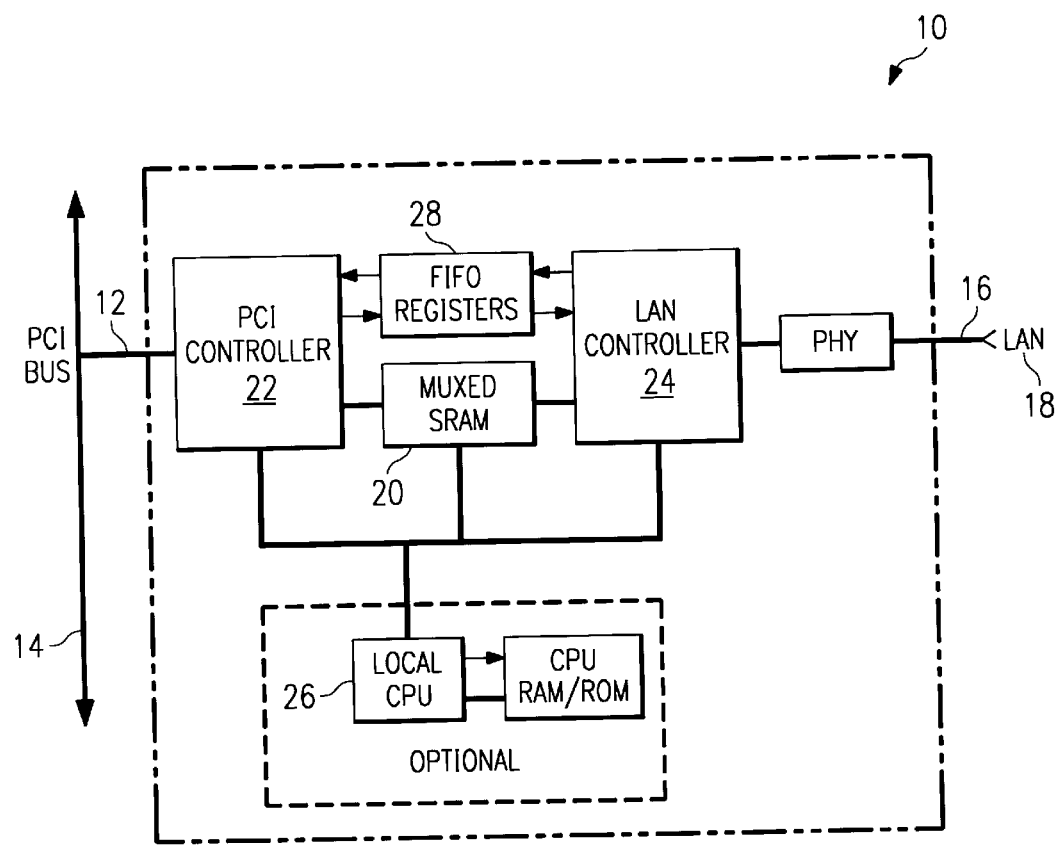

NETWORK ADAPTER HAVING SINGLE PORTED MEMORY WHICH IS ACCESSIBLE BY NETWORK AND PERIPHERAL BUS ON A TIME DIVISION MULTIPLEXED (TDM) BASIS

This application is a Continuation, of application Ser. No. 08/334,306, filed Nov. 4, 1994, now abandoned.

BACKGROUND OF THE INVENTION

1. Field of the Invention

This invention relates to improvements in local area network adapters.

2. Background Art

A local area network (LAN) is a high bandwidth computer network, operating over an area, such as an office or a group of offices. In order for individual computers to communicate with others or with a host or server each computer must have a LAN adapter.

Two styles of LAN adapter have emerged due to the predominance of Ethernet and Token-Ring networks. The Ethernet MAC protocol requires no local processing, so Ethernet adapters tend to be simple "dumb" adapters. The Token-Ring protocol requires local processing of MAC frames by the adapter, so Token-Ring adapters need a local CPU, making them "smart" adapters.

The so called dumb adapters have very shallow data FIFOs providing them with low communication latencies, but poor tolerance of variations in Host bus latency. The smart adapters usually use some form of "store and forward" architecture due to the need for local processing. This can lead to high communication latencies, but give a high tolerance to variation in Host bus latency.

One of the disadvantages of known adapters is that they cannot support very high band width access and generally are not capable at operating at the high speeds currently emerging in LANs. In addition, they are designed to either have local processing capabilities or not. There is no provision of a system which permits local processing only when necessary.

In addition, known adapters typically include an external storage element, such as a RAM (Random Access Memory) or a FIFO (first in first out) memory. This obviously takes up more space and contributes to some of the other disadvantages mentioned above.

Accordingly, one object of the present invention is to provide a general purpose LAN adapter, which suffers from none of the aforementioned disadvantages of the prior art.

SUMMARY OF THE INVENTION

According to one aspect of the present invention there is provided an adapter for connecting an asynchronous data communication component network system to a computer peripheral bus, the adapter comprising a multiported memory which is accessible, in use, by both the network and peripheral component on a time division multiplexed (TDM) basis.

The advantages of the present invention provide an adapter which allows local processing to be supported if necessary. Further, the invention provides an adapter that is better adapted to cope with the high speeds emerging in LAN technology.

Use of a single synchronously accessed RAM array for data and control storage, leads to an efficient silicon implementation. An on-chip RAM array can have fast access times and high bandwidth.

RAM based FIFO implementation allows FIFO size and number to be hardware configurable. This allows an adapter to be configured to provide either a small number of deep FIFOs or a larger number of shallow FIFOs. This is especially important with the emergence of multi-priority applications such as multi-media.

Use of a shared RAM gives FIFO-like latencies whilst allowing local processor connection if required.

DESCRIPTION OF THE DRAWINGS

Reference will now be made, by way of example, to the accompanying drawings, in which: the single figure shows an adapter according to the present invention.

DETAILED DESCRIPTION OF THE PREFERRED EMBODIMENTS

The adapter shown generally at 10 includes a connection (12) to a Peripheral Component Interconnect bus (PCI Bus) (14) and a LAN connection (16) to the LAN (18). The adapter includes a triported Static Random Access Memory SRAM (20) which is connected between a PCI bus controller (22) and a LAN controller (24). The third port is an optional connection to an optional local CPU (26). FIFO control registers 28 are used to implement circular buffer FIFOs in the multiported SRAM for network data. It will be understood that the SRAM could be replaced by any other type of RAM memory array. In a preferred embodiment of the invention, the RAM is a Time Division Multiplex (TDM) ported RAM with a high bandwidth. The RAM is used to provide both network data FIFOs and control data storage. In addition, if local frame processing is required the RAM can also be accessed by the local CPU (26).

The adapter stores network data and control information in the internal RAM array. This RAM has a wide access port (twice the host bus width or more), and is clocked synchronously to the host bus clock. A RAM access port that is twice the width of the host bus means that transfers to/from the host bus at the maximum bus rate (one word per cycle) only require access to the RAM every other cycle. The other cycles can be used to allow network or local CPU accesses to the RAM. Generally, Host bus data transfer rates are far higher than network rates; (PCI) is 1 Gbit/S, High-Speed Ethernet 100 Mbits/S, so there is more than enough bandwidth available for network transfers. This excess bandwidth can be used to allow access by a local CPU for local frame processing if the network protocol requires it.

Synchronization of data to/from network clocks takes place in the LAN controller block using simple holding latches. All the other functional blocks operate synchronous to the PCI bus clock (which is the timing reference for the RAM).

Consider a 33 Mhz PCI bus based system with 64 bit wide internal RAM.

Full 1 Gbit/S (33 Million 32 bit words/S) PCI streaming bandwidth is achieved by accessing the RAM once every other cycle. 64 bit RAM words are split/packed to provide the 32 bit word stream.

The remaining cycles can be allocated to the network controller, and optional CPU dependent on required bandwidth. If all remaining cycles are allocated to the network controller, then it will have 1 Gbit/S of bandwidth into the RAM. Alternatively, the RAM can be accessed in smaller word sizes to simplify network controller design.

An 8 bit (one byte) RAM access port would provide 128 Mbit/S of bandwidth, more than enough for conventional Token-Ring or Ethernet networks.

Separate 16 bit ports for receive and transmit, with alternate access would provide 128 Mbit/S full duplex to support the full-duplex version of 100 Mbit/S CSMA/CD networks.

Obviously, the choice of multiplexing rate and the RAM access width will be dependant upon the particular implementations required, for example, network data rate and Host bus frequency spreads.

In the above example, the RAM is accessed every other cycle by the host bus and on other cycles by the network (or local CPU). In certain applications, the ratio of sharing may be different from 1:1, for example 2:1 or 1:2, etc.

Having thus described one particular embodiment of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. An adapter, adapted for connecting an asynchronous data communication network system to a computer peripheral bus having a predetermined width, the adapter comprising a single ported memory having an access port with a width that is at least twice said predetermined width of said peripheral bus, which is accessible, in use, by both the network and peripheral bus on a time division multiplexed (TDM) basis, wherein the peripheral bus is controlled by a clock having cycles and the single ported memory is accessed by the network and the peripheral component on different clock cycles according to a predetermined relationship.

2. An adapter according to claim 1, wherein a local processor is also accessible to the single ported memory by way of a bus internal to the adapter.

3. An adapter as claimed in claim 1, wherein said predetermined relationship is that the single ported memory is accessed by the network on every other clock cycle and the peripheral component during the other clock cycles.

4. An adapter according to claim 1, wherein the single ported memory comprises a RAM.

5. An adapter according to claim 1, wherein the single ported memory comprises an SRAM.

6. An adapter according to claim 1, wherein the adapter is connected between a Local Area Network (LAN) and a peripheral component interface (PCI) bus.

7. An adapter according to claim 6, further comprising a PCI controller connecting the single ported to the PCI bus.

8. An adapter according to claim 7, further comprising a LAN controller connecting the single ported to the LAN.

9. An adapter according to claim 1, further comprising FIFO control registers operable to cause the single ported to implement a circular buffer FIFO effect.

10. A method of effecting communication between an asynchronous data communication network and a computer peripheral bus operating under control of a clock having cycles and having a predetermined width, comprising:

connecting an adapter between the network and the peripheral bus, said adapter comprising a single ported memory having an access port with a width that is at least twice said predetermined width of said peripheral bus, and which is accessible, in use, by both the network and the peripheral bus on a time multiplexed basis;

allowing the network to access the single ported memory on every other clock cycle; and allowing the bus to access the single ported memory during the other clock cycles thereby effecting data and control storage during the respective clock cycles.

* * * * *